US006836475B2

(12) United States Patent
Chaskar et al.

(10) Patent No.: US 6,836,475 B2
(45) Date of Patent: Dec. 28, 2004

(54) METHOD AND APPARATUS FOR TRAFFIC SHAPING FOR IP ROUTER QUEUES/EGRESS

(75) Inventors: Hemant M. Chaskar, Woburn, MA (US); Rayadurgam Ravikanth, Waltham, MA (US)

(73) Assignee: Nokia Corporation, Espoo (FI)

( * ) Notice: Subject to any disclaimer, the term of this patent is extended or adjusted under 35 U.S.C. 154(b) by 758 days.

(21) Appl. No.: 09/727,559

(22) Filed: Dec. 1, 2000

(65) Prior Publication Data

US 2002/0097719 A1 Jul. 25, 2002

(51) Int. Cl.[7] .............................................. H04L 12/28
(52) U.S. Cl. ...................................... 370/351; 370/408
(58) Field of Search ................................ 370/351, 400, 370/401, 408, 230.1, 235.1, 255, 412, 395.4, 468

(56) References Cited

U.S. PATENT DOCUMENTS

| 4,987,536 A | * | 1/1991 | Humblet .................... 709/241 |
| 5,353,412 A | * | 10/1994 | Douglas et al. ............ 709/243 |
| 5,455,825 A | * | 10/1995 | Lauer et al. ................ 370/413 |
| 5,463,777 A | * | 10/1995 | Bialkowski et al. ........ 707/102 |
| 5,781,531 A | * | 7/1998 | Charny ....................... 370/232 |
| 6,490,629 B1 | * | 12/2002 | Milliken et al. ............ 709/232 |
| 6,628,668 B1 | * | 9/2003 | Hutzli et al. ................ 370/468 |

OTHER PUBLICATIONS

Rexford, J. et al., "Scalable Architecture for Integrated Traffic Shaping and Link Scheduling in High–Speed ATM Switches"; IEEE Journal on Selected Areas in Communications; Jun. 1997; pp. 938–950; vol. 15. No. 5.
Stiliadis, D., varma, A., "A General Methodology for Designing Efficient Traffic Scheduling and Shaping Algorithms", IEEE 1997, pp. 326–335, 0–8186–7780–5/97.

* cited by examiner

*Primary Examiner*—Chau Nguyen
*Assistant Examiner*—Nittaya Juntima
(74) *Attorney, Agent, or Firm*—Wayne DeMello; Harrington & Smith, LLP

(57) ABSTRACT

A shaper 201 and a scheduler 203 are combined to determine a target tree 203 and insert 207 a tag into a data structure, wherein the tag is associated with a packet that has reached the head of line (HOL) of a queue in a packet router. A tag may become an eligible tag and be placed in a set of tags to be searched. Such tags are searched for the smallest tag. A packet associated with the smallest tag is transmitted if the output link is available.

29 Claims, 6 Drawing Sheets

METHOD AND APPARATUS FOR TRAFFIC SHAPING FOR IP ROUTER QUEUES/EGRESS

FIELD OF THE INVENTION

The invention relates to providing a traffic shaping and scheduling function for the release of packets from a queue, and more particularly, to providing a scalable, low-latency and low-loss, traffic shaping in a variable-length packet network that can work in conjunction with various scheduling algorithms.

BACKGROUND OF THE INVENTION

A router of packets or cells in either an internet protocol (IP) or asynchronous transfer mode (ATM) network, must associate incoming packets or cells with an output port or link. For purposes of discussion, we will refer only to packets as a more generalized form of cell. The link, in order to avoid local collisions at a router or data switch, must often queue packets before dispatching. The act of selecting from two or more queues of a packet having the correct priority for transmission on the output link is the job of the scheduler unit. The scheduler unit in a router schedules packets for transmission, thus transmitting packets from one queue at a time. Frequently scheduling algorithms running on the scheduler unit have measures in place to either 1) not play favorites among the input queues; or 2) favor an input queue or a data flow according to an established priority scheme. In some cases, a pseudo-random element may be introduced into the selection of packets for transmission. Frequently such pseudo-random elements have been used to determine when to discard packets when queue overflows are occurring or are imminent.

Shaping, or the processing done by a shaper unit, has different goals however. Rather than prepare packets for transmission from different queues, a shaper will time, or delay packets from a particular queue to enforce limitations on rates of data or rates of packets allowable from that queue. This action smoothes out the burstiness that would otherwise occur in the output link of packets from that queue. The intended outcome and goal of the shaper, is to diminish wide swings in data rates to routers downstream from the current router, and diminish the chances of buffer overflow in those routers.

Some developments in routers have been able to combine shaping algorithms with scheduling algorithms. The competing goals under such schemes are to maintain fairness among queues, minimize delays and drops of packets, reduce burstiness while keeping the algorithm to a modest complexity that can scale to ever increasing traffic rates and sources. One such attempt has been limited to scheduling and shaping of ATM cells (Jennifer Rexford, Flavio Bonomi, Albert Greenberg, and Albert Wong, "Scalable Architectures for Integrated Traffic Shaping and Link Scheduling in High-Speed ATM Switches", IEEE Journal on Selected Areas in Communications, Vol. 15, No. 5, June 1997, pp. 938–950.) Therein, architectures are disclosed that perform a shaping operation in series with a scheduling operation. In addition, the architectures are limited to fixed cell sizes used in ATM.

In developing routers that have both scheduling and routing, it is imperative that complexity of the algorithms that perform these functions is kept low. Low complexity algorithms reduce computational delays, and enhance the scalability of the router, i.e. the router may handle more data or more links or both.

Routers generally have central processing units that execute programmed instructions. Such instructions may be stored in a memory unit. The memory unit may also hold data structures that permit various operations to occur. Such data structures may include queues that may store data packets that await transmittal from the router.

A memory location may be addressed by various means in the art. An array or a linked-list data structure may have conceptually adjacent storage space in a memory location. A datum stored adjacent to another datum, is said to be one step away from the first datum. Similarly, the term 'location' is used interchangeably with 'storage space', such that both terms denote a space in memory that may be addressable in linear terms as an absolute location related to the beginning of memory. Memory may be allocated dynamically so that, although storage may not be physically next to each other, an array, for example, may be indexed in sequential steps.

A data structure has a capacity to store data or a storage capacity. Such a capacity may be strictly limited, e.g. as in an array having a preset number of elements. Such a capacity may be open-ended, such as a linked list, or a tree structure, in which capacity may be limited only to the amount of available unallocated memory.

A binary tree is a useful data structure. Its advantages are that it can be grown to the limits of available memory, and be rapidly reallocated by setting a root node pointer to null. Similarly, such a tree can be rapidly searched and navigated to locate a smallest or largest data element stored amongst its nodes.

SUMMARY OF THE INVENTION

According to an embodiment of the invention, a packet that reaches the head of line (HOL) of a queue is handled by a release-time calculator to determine whether to discard a packet, associate the packet with an eligible tag, or place the packet or associated data amongst trees waiting to become eligible. If the packet is not discarded, a tag, which may be a floating-point number, is created for the packet. The tag may operate as a criterion for sorting a packet in a binary tree of tags.

The tag, then, is one of the determinants of the order in which several packets are selected for transmission. The tag may be added to a data structure, which may be a circular-data structure such as a list of trees that is rotated after each time interval or delta time. There may be a band of eligible trees in the list of trees. The tag may be added to the latest of the eligible trees, or added to a tree in the list that may eventually be added to the band of eligible trees. The operation of a tree shifting from an ineligible tree to the band of eligible trees may be a step to select an eligible set of trees. The operation of selecting an eligible set of trees may include removing a tree from the eligible set of trees. A set of eligible tags may be created from tags in the eligible trees. The set of eligible tags may expand to include tags that had formerly been in an eligible tree.

Tags may be removed from the data structure when a tag is the smallest among tags in the eligible set of tags. When this occurs, a packet associated with the tag may be transmitted through the output link. A larger tag will have priority in as compared a smaller tag that has not yet entered the eligible set of trees. Otherwise, the smallest tag always prevails amongst the set of eligible tags. This results in selection of a tree without consideration of any release time associated with the tree for purposes of selecting a tag or packet associated with the tree, so long as the tree has graduated to be among the eligible trees. Thus a release time calculation of a shaping algorithm influences selection only to the extent the shaping algorithm may delay associating a packet and tag with an eligible set of tags.

The present invention may provide the flexibility to perform traffic shaping on flows having packets of arbitrary length, and therefore, may be suitable for internet protocol (IP) routers. More importantly, a scheduling algorithm may be performed as well. A maximum complexity may be set in some embodiments by limiting complexity of trees, and therefore tree-sorting algorithms, by discarding packets upon conditions of tree overflow and stale tags. Such trees enhance shaping because their data content is chiefly tag or shaping information.

Embodiments of the invention are easy to scale upward to high-transmission speeds, and computational times, in most cases, do not increase as fast a transmission throughput. For example, an algorithm using a single tree to store the scheduled (only) release times of multiple flows of packets will be as complex or more complex than a distributed set of trees having both a scheduling component and a shaping component in their organization. Consequently, the time to build the data structure of multiple trees (per an embodiment) will be no worse than a competing algorithm; and moreover, the time to select an optimal packet for transmission may similarly be no worse than the competing algorithm. The complexity of tree additions and removals according to one or more embodiments of the invention increases as a logarithmic function of the number of flows that are competing for the output port. In addition, the scheduling function and the shaping function can be said to be largely complete prior to inserting data to a circular-data structure. Additional operations may occur afterward; however, this aspect of doing much of a scheduling operation concurrent to shaping calculations is efficient as compared to a purely serial-shaping, then scheduling, algorithm.

BRIEF DESCRIPTION OF THE DRAWINGS

The disclosed inventions will be described with reference to the accompanying drawings, which show important sample embodiments of the invention, wherein.

DETAILED DESCRIPTION OF THE PREFERRED EMBODIMENTS

Figure 1A:
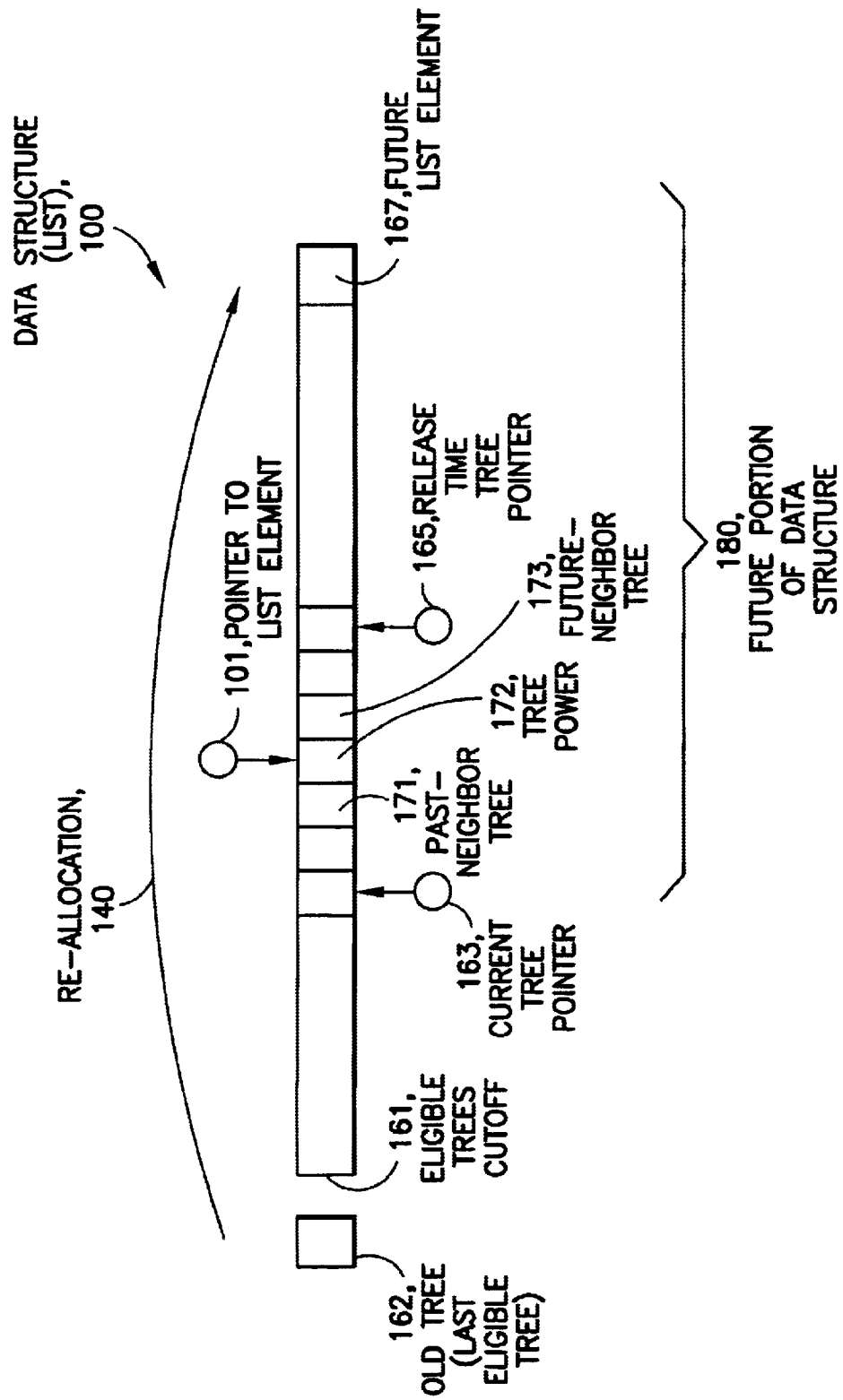
FIG. 1A shows a list of tree pointers.

FIG. 1A shows a data structure 100 of root-node pointers to tree-data structures, which may be binary trees. The data structure 100 may be a linked list or an array or a number of equivalents. The list may be circular in nature, such that moving a pointer 101 along the list in a given direction eventually brings the pointer to its starting point. The list stores M pointers to trees, which may be initialized to null pointers. An index may be used to track the list, such that a list element, or tree number may be numbered 0 through M−1. As an example, for a list of M elements, there may be list elements 0 through 199. There is a release time associated with each tree. The release time may indicate the earliest time when the corresponding tree becomes eligible for transmission.

A current tree pointer 163 may be used to identify or select one or more trees that may contain tags associated with packets that are eligible for transmission. Each node in the trees pointed to by the elements of list 100, e.g. the left node 155, may be a tag representing the scheduling priority and information concerning a packet identity or storage location. The terms left and right are arbitrary spatial terms. An equally fitting term of smaller node and larger node, or smaller side and larger side could be used. The tree, in essence, may be a binary tree.

Figure 1B:
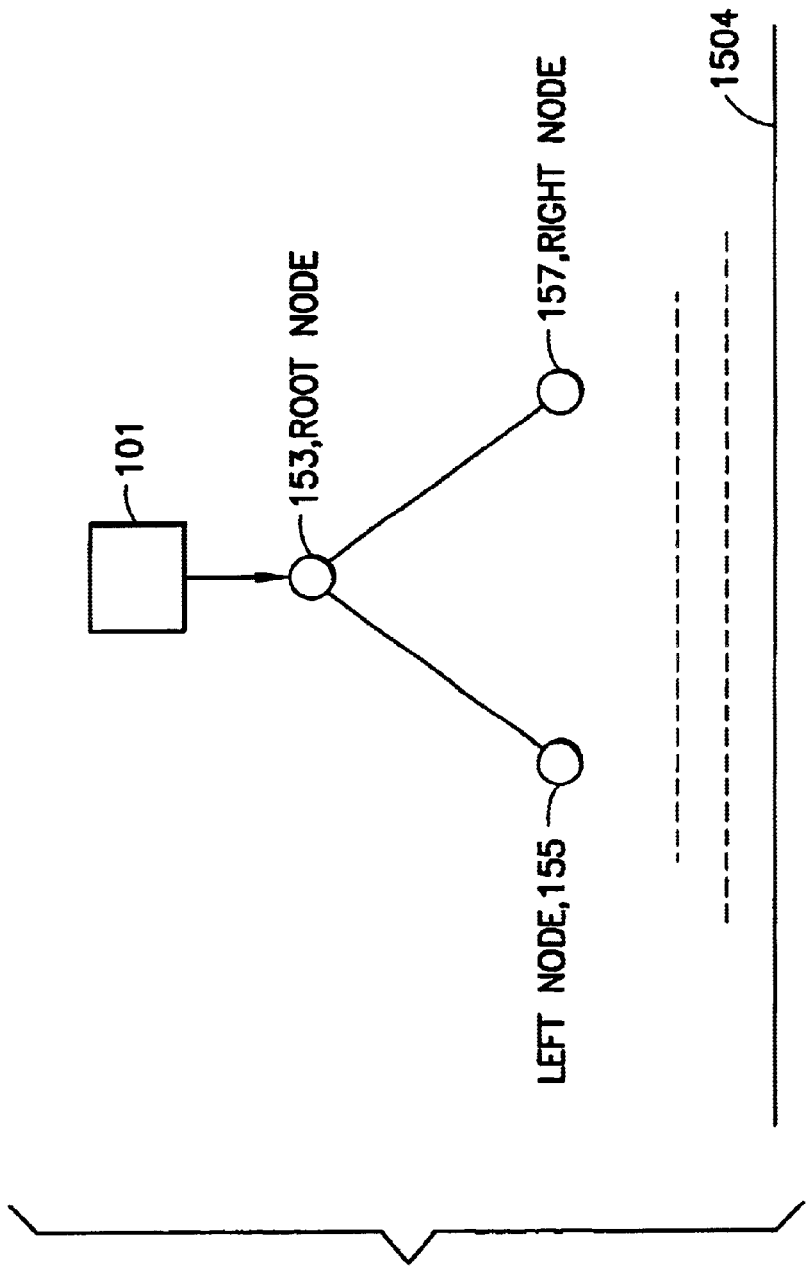
FIG. 1B shows a tree of tags pointed to by a tree pointer of FIG. 1A.

FIG. 1B shows a tree that may be pointed to by a list element 101. The tree may have a root node 153, a left node 155 that is located to the left of the root node 153, and a right node 157 that is located to the right of the root node 153. A list element 101 may be associated with a range of times.

There are points of interest along the list 100. In order from oldest time to newest or most futuristic time, the points are a) current tree having a current-tree pointer 163; and b) release-time, tree pointer 165. Each list element, e.g. tree pointer 172, may have a future neighbor or future-neighbor tree 173 and a past neighbor or past-neighbor tree 171. One or more trees in the future may comprise a future neighborhood. One or more trees in the past may comprise a past neighborhood. The cutoff for eligible trees 161 may be T-time units before the current tree 163. An advancement of the tree pointed to by current tree pointer 163 may result in list element or old tree 162 being more than T from the list element pointed to by the current-tree pointer 163. That list element or old tree 162 may be converted or reallocated 140 to a T1-time units, list element 167 in the future. The tree pointers that extend from the tree pointed to by current-tree pointer 163 to far-future tree 167 may comprise a future portion 180 of the data structure. The future portion may thus be the T-list elements right of the current-tree pointer 163 and including the current tree. An advancement or forward movement of the pointers may occur when a time unit (delta-t) has elapsed. This causes current-tree pointer 163 to move from left to right, i.e. the pointer points to a future neighbor, while the last eligible tree 162 is reallocated 140. Looking at it another way, the list elements move from right to left, while a current-tree pointer 163 remains unchanged in position.

The tree pointed to by the current-tree pointer 163 and all trees to the left of it, including the tree at T units from the current-tree pointer, are called post-current trees. All tags within these trees are post-current tags. In addition, any tags that were once in the post-current trees, and that continue to be available, may also be known as post-current tags. The set of trees that are post-current trees changes with every advancing of the current-tree pointer. Similarly, the portion of the data structure which is the future portion shifts to reflect the movement of the current-tree pointer.

Reallocating all tags in an old tree, or reallocating substantially all tags in an old tree is the operation of destroying the tree. The tree may be reinitialized to a null pointer at this time. A tag that was the smallest tag in a tree at the time of tree destruction is called a vestigial tag.

What does this have to do with packet queues and scheduling a packet for transmission? Well, traffic or packets that conform to a shaping algorithm, e.g. the leaky bucket algorithm, are immediately eligible for transmission on the outgoing link. Each such packet may be assigned a tag based on a weighted, fair-queueing algorithm, such as virtual clock. This tag represents the transmission priority of the packet relative to all the packets that are currently eligible for transmission. Note that the ordering of release times does not necessarily imply the same ordering of tags. The tag may be placed in a tree, where the tree receiving this tag is determined as per a release-time algorithm. For each queue at the output port of a router, a traffic-shaping profile is provided, which may be based on the leaky-bucket algorithm.

The leaky bucket, as known in the art, may have two parameters: R, the rate at which tokens are added to the bucket; and B, the capacity of the bucket to store tokens. No more than B tokens may be added to the bucket. A packet having a block size of L bytes must claim L tokens from the bucket before it is eligible for transmission. This ensures that the bytes transmitted on the output link from that queue is always less than or equal to R*time+B, where 'time' represents any time interval. The foregoing defines the leaky-bucket shaper.

Figure 2:
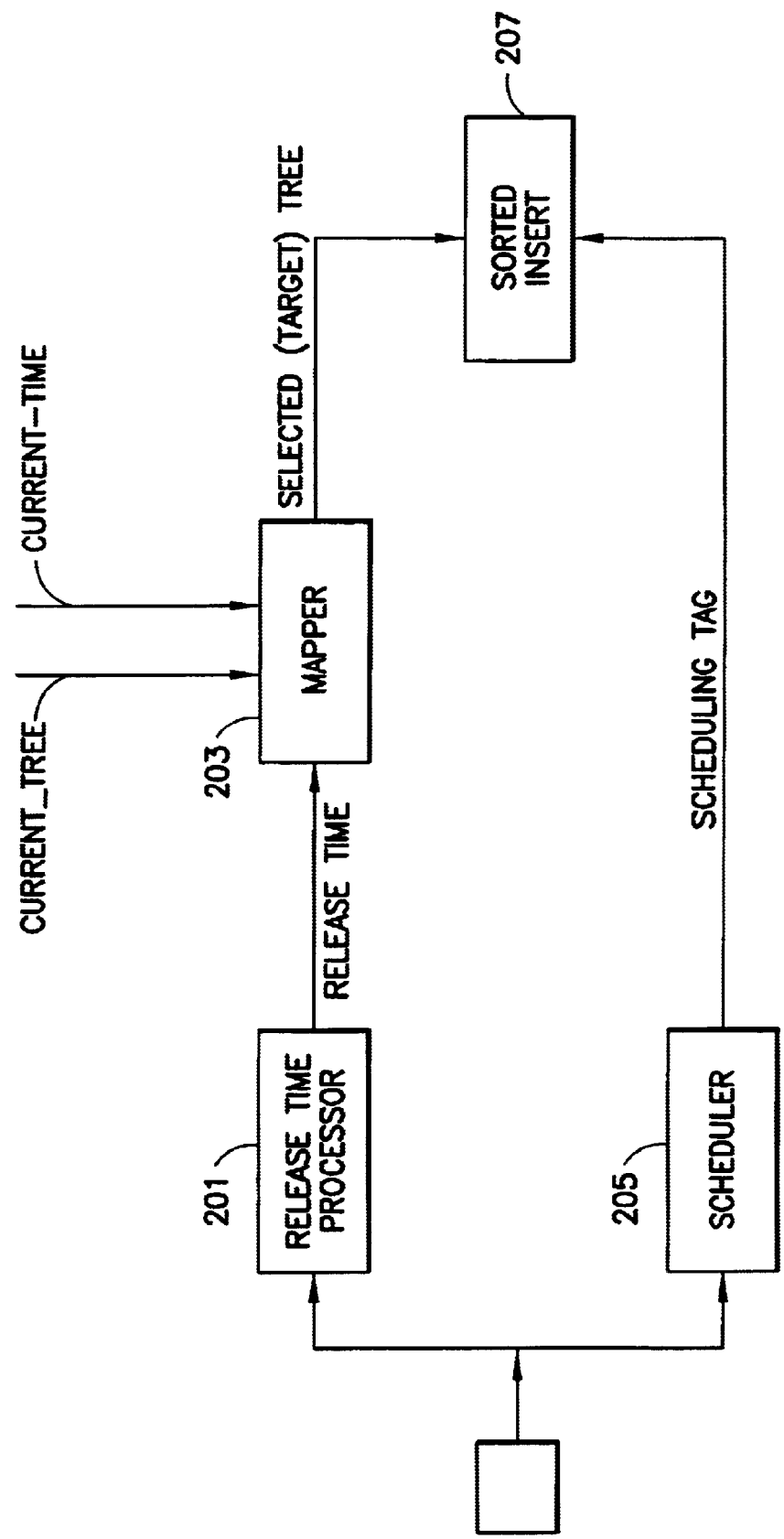
FIG. 2 shows a block diagram of a combined shaper and scheduler apparatus according to an embodiment of the invention.

FIG. 2 shows a combined shaper and scheduler according to an embodiment which includes a release-time processor 201 which may use scheduling algorithms known in the art, e.g. a leaky bucket. A release-time algorithm based on the leaky bucket may operate as shown in table 1, wherein the quantity of tokens present in the bucket at a given instant is denoted by x. The departure time of the last-data block on the output link is denoted by y, and the present time is denoted by t. The rate the bucket fills with tokens is R; L is the size of a packet that reaches the HOL position of a certain queue in the output interface at time t. B is the bucket size. B, x, R, and L may be expressed in consistent units, including bytes.

TABLE 1

| Pseudocode | Comment |
| --- | --- |
| 1 Temp = min(x + R(t − y)$^+$, B); | Use absolute value of t − y |
| 2 If (temp >= L) | If there are more than or equal to L tokens present in the bucket |
| 3 THEN | |
| 4 x = x − L | Claim L tokens from the bucket so that new bucket occupancy is x − L |
| 5 Y = t | |
| 6 Release time = y; | |
| 7 ELSE | |
| 8 X = 0; | New buffer occupancy at release time is going to be 0 as this block is going to claim all the tokens that would arrive until release time. |
| 9 Y = y + (L − Temp)/R | Estimate the time it will take to fill the bucket to level L starting from the current occupancy, Temp |
| 10 Release time = y | |

The if-then branch of the foregoing pseudocode sets release time to now, whereas, the 'else' branch of the pseudocode sets release time to some time in the future. The above algorithm would be used to operate on the packet that is at the head of line (HOL) of the queue.

FIG. 2 shows the operation of the combined shaper and scheduler. The release-time processor 201 generates the release time, which may be according to a scheduling algorithm. If the release time is too far into the future, e.g. release time>T, where T represents a cutoff or discard time, then the packet is discarded. Otherwise a mapper 203 identifies a target tree based on the current_time, release time and the current_tree in relation to the time granularity or delta-t and the available number of trees, or M.

Target tree=[current_tree+(release time−current_time)/delta-t] modulo $M$

The target tree is the whole unit calculation of the modulus operation, and operates as an index into the data structure 100. Thus each tree is associated with a quantized period of time. For example, the tree one step ahead of the current_tree is associated with the delta-t time period ahead of the current_tree. A tree two steps ahead of the current tree is associated with the next delta-t time period ahead of the current_tree, wherein the first delta-t time period of the first tree does not overlap with the second delta-t time period of the second tree.

Packets that satisfy the cutoff time are associated with a scheduling tag from scheduler 205, which may be a weighted, fair-queuing algorithm, such as virtual clock, among others known in the art.

Mapper 203 may operate in several ways to select a selected tree based on target tree. The simplest way is merely to make the selected tree the target tree. In which case the scheduling tag from scheduler 205 is placed in a tree pointed to by the selected tree. Sorted insert 207 places the tag in the tree according to standard, binary tree-sorting algorithm. Thus, mapper 203 selects a selected tree among a preset number of trees in the data structure 100 thus performing a mapping function. Sorted insert 207 adds a node to a selected tree, such as in FIG. 1B, thus inserting the tag. Combined, the steps of mapping and inserting may accomplish adding a tag to a future portion of a circular data structure. If the if-then branch of the loop is taken, release time is now, and the mapper 203, according to a first embodiment, selects the same tree that is pointed to by the current tree pointer 163 of FIG. 1A. The sorted insert 207 positions the tag in that tree according to standard, binary tree-sorting algorithm. A mapper may count the nodes it sorts through as it identifies a position to locate the tag in the binary tree. If the node count or tree depth is greater than a maximum size 154, the tag may be discarded. The reason this approach might be taken is to keep the complexity of the trees to a reasonable level. This is done because, typically, a limited number of processing clock cycles are assigned to perform the task of sorted insert. This limits the number of comparisons that can be performed while inserting a tag in the tree.

Figure 3A:
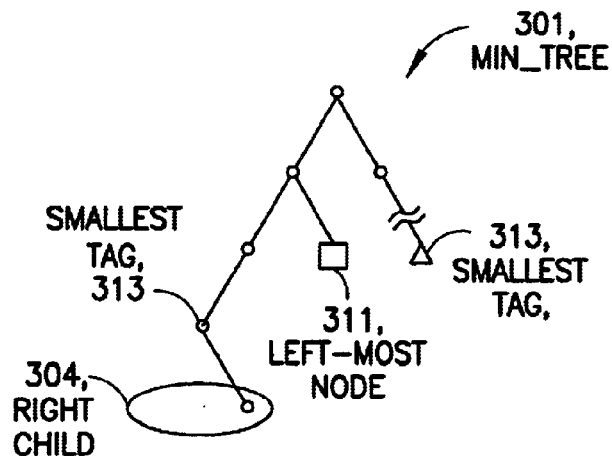
FIG. 3A shows the construction of a min-tree.

FIG. 3A shows a tree of minimums or min-tree. Tags that are placed in trees become eligible for selection at the removal stage. The removal stage relies on a set of eligible tags, which may be stored in a tree of minimums, or a min-tree 301. A tree of minimums may consist of a null pointer. The tree of minimums may be grown by adding a tag based on the tag value of the tag so that the min-tree is arranged as a binary tree.

Figure 3B:
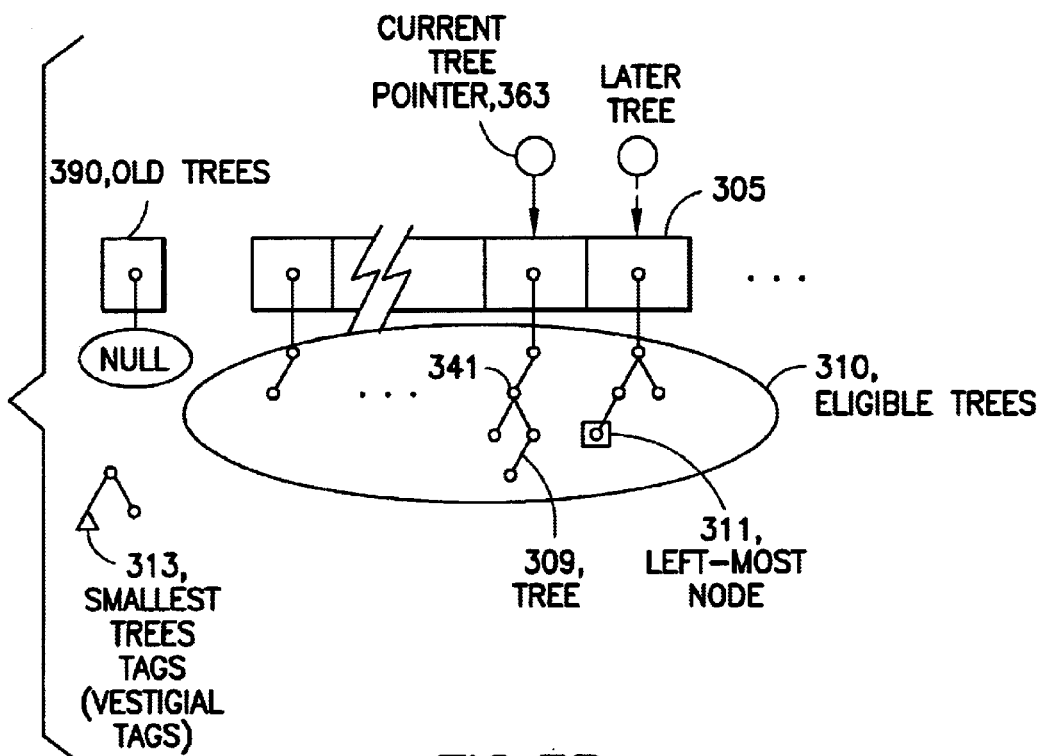
FIG. 3B shows the relationship between the list of tree pointers and the min-tree.

FIG. 3B shows the relationship between the list of tree pointers and the min-tree. When a current tree pointer 363 is advanced to a later tree 305, the leftmost node 311 of the tree, is the one with the smallest tag among all the nodes in that tree. This is because each tree is built according to a binary tree-sorting algorithm. This smallest tag of the tree is also inserted in the min-tree according to standard binary tree-sorting algorithm. The step of inserting is also known as adding.

Similarly, in order to prepare the tree 390 that advanced beyond T-time units past the current tree, the root of the tree

390 may be set to be a null pointer. The tags in such a tree may be discarded along with any packet associated therewith. The tree associated with the list element 390 is, in a sense, re-allocated and thus is no longer included among the eligible trees. The tree pointed to by the list element now becomes a candidate to receive new tags. It is considered to be T-1 units ahead of the current time, on account of the circular nature of the list 101. The smallest tag that belonged to the post-current tree may be retained in the min-tree until that tag becomes the smallest tag in the min-tree, while the corresponding packet may be maintained. A tag that was the smallest tag in a tree at the time of tree destruction is called a vestigial tag. A min-tree that includes vestigial tags is an expanded min-tree. Any type of min-tree is composed entirely of tags that are associated with packets that are eligible for transmission, i.e. a min-tree is made up of the set of eligible tags. The min-tree may have no more than one tag from a tree.

Transmitting of a packet is accomplished as follows:

When there is capacity open on the output port for another packet, the min-tree 301 is searched for the smallest tag 303 therein. Such a search does not require much processing, since the smallest tag is the leftmost tag. That tag is removed as the packet associated with the tag is transmitted through the output port. The tag 303 may be duplicated in a tree 309 of the eligible trees 310; and so the tag may be removed from that tree 309 as well. Note that this tag is readily available in tree 309 as the smallest tag in that tree.

Following this operation, a right child 304, if any, of the removed tag 303 may be elevated to the vacant spot. The min-tree 301 may be a tree of the smallest nodes of each tree among the set of trees 310 eligible for scheduling. The parent node or the right-child node, if any, may then become the smallest node in the corresponding tree. As such, the parent node may be added to the min-tree 301 as representing the smallest tag in the corresponding tree. A vestigial tag may not have a tree structure other than the min-tree. Thus a vestigial tag, if it is the one that is removed, may not be replaced with a corresponding tree tag. The generic name for a tag that has-been a part of a tree at, or within T, and steps past the current-tree pointer 363 is post-current tag. This may include tags that have become vestigial tags, e.g. smallest tag 313. A tree is said to be post-current if the tree is at or within T-steps past the current-tree pointer. Note a post-current tag may not necessarily be a in a post-current tree.

Several alternative mapper algorithms may be implemented that place a somewhat heavier weight on keeping trees short, or low-tree depth, at the sacrifice of short latency in dispatching a packet.

Figure 4A:
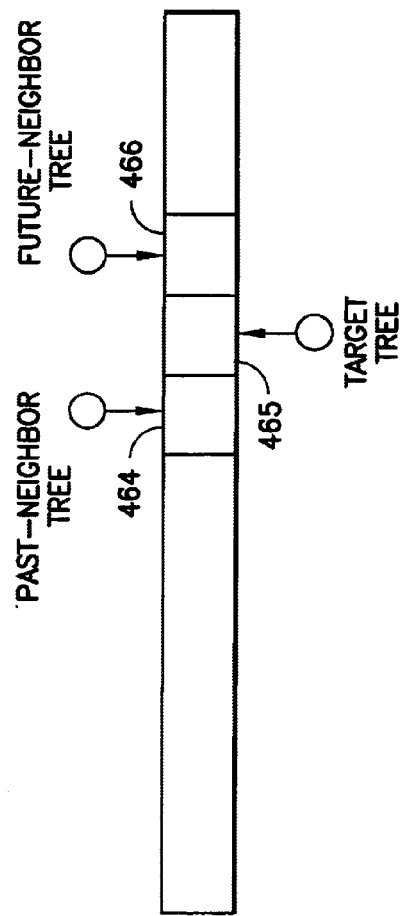
FIG. 4A shows a selection set of tree pointers used by a first alternative mapper.

FIG. 4A shows a selection set of tree pointers used by a first-alternative mapper. The first-alternative mapper may select the shortest of trees that are near the target tree 465, e.g. by selecting a future-neighbor tree 466, the target tree 465 and a past-neighbor tree 464, and then evaluating the tree depth of each tree. It is understood that the target tree is near itself, i.e. the quality of being near a tree includes being the tree itself, wherein the tree is zero steps from itself. The mapper then finally selects a tree having the shortest depth as the insert tree, from among the set of near trees. The insert tree may then be provided to the sorted insert 207.

Figure 4B:
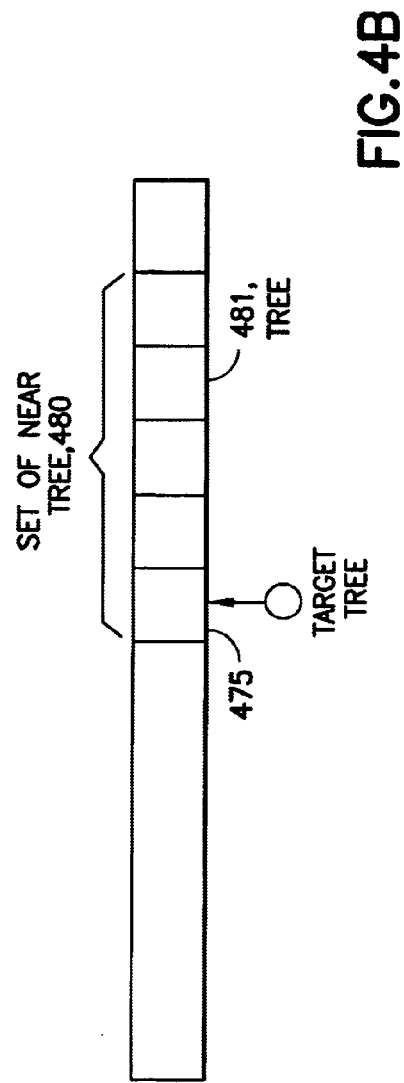
FIG. 4B shows a selection set of tree pointers used by a second alternative mapper.

FIG. 4B shows a selection set of tree pointers used by a second-alternative mapper. The second-alternative mapper may select trees that are ahead of the target tree 475 together with the target tree 475 to arrive at a set of near trees 480. The mapper may apply a formula that weights the factors of tree depth combined with the number of steps distant a tree is from the target tree to arrive at a value, wherein the tree possessing the smallest value is selected as the insert tree. As an example of steps, the tree 481 is three steps ahead of the target tree 475. The insert tree may then be provided to the sorted insert 207.

Since the complexity of later inserts may depend upon trees being optimized to be short, it can be helpful if some processing time is devoted to reducing tree length or size. A complete optimization of a large tree can be costly; however, a modest sub-tree optimization can curb tree growth, without, in some cases, resorting to discarding a packet because of excessive tree growth.

Figure 5:
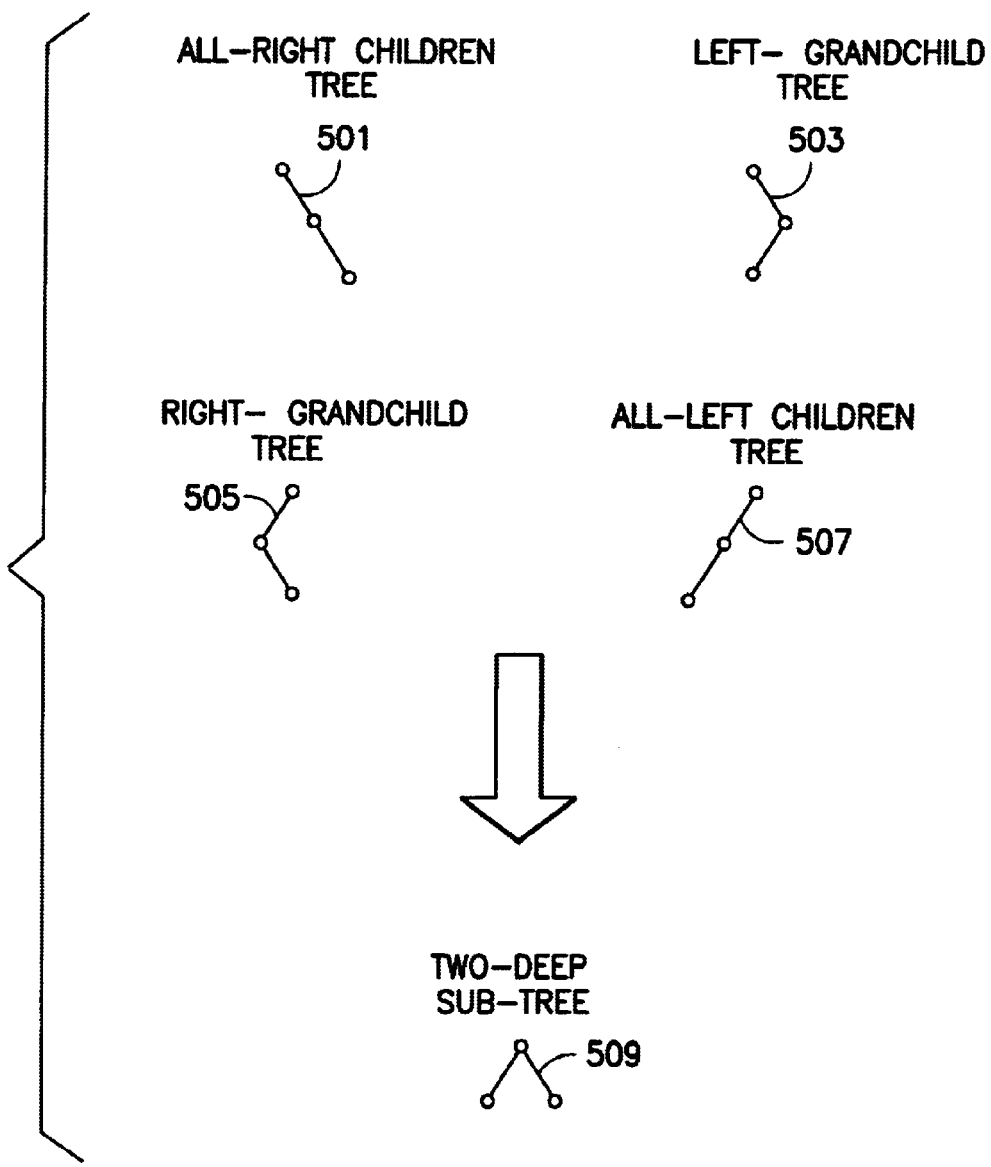
FIG. 5 shows non-optimal three-node combinations and an optimized three-node combination of a binary tree.

FIG. 5 shows four three-node sub-trees that are not optimal. In every case, each node in the branch has a single child node. There is an all-right, children tree 501; a right-child, left-grandchild tree 503; a left-child, right-grandchild tree 505; and an all-left, children tree 507. These sub-trees can be converted from sub-trees having a size of three to a two-deep sub-tree 509. In other words, the size three sub-tree is converted to an optimal sub-tree. Such a conversion process is known in the art, and may be performed as an iterative step with the addition of new nodes, or by a separate process. Note that converting may be done anytime the nodes of a sub-tree can be arranged to form a sub-tree that observes the rules of binary trees, but yet has a smaller length than the original sub-tree. Thus a sub-tree of fewer than 8 nodes may be optimized to a length of 3. Fewer than 16 nodes can be optimized to a length of 4, i.e. sub-trees having nodes less than $2^X$ may be converted to optimal lengths of less than or equal to X.

If the mapper, first-alternative mapper, and second-alternative mapper are susceptible to still-producing trees of excessive length, a modification to each of the mapping algorithms may be done. FIG. 1B shows that a maximum size 154 of the tree depth may be enforced, wherein the tag and associated packet may be discarded when the insert tree has reached the maximum size. The condition of a tree reaching a maximum, and a tag being discarded as a consequence thereof, is known as tree overflow.

Although the invention has been described in the context of particular embodiments, various alternative embodiments are possible. For example, algorithms other than the leaky bucket may be used for the shaping calculation, e.g. the calculation of release time. Thus, while the invention has been particularly shown and described with respect to specific embodiments thereof, it will be understood by those skilled in the art that changes in form and configuration may be made therein without departing from the scope and spirit of the invention.

What is claimed is:

1. A method for transmitting a packet, said packet having a release time and a tag having a tag value comprising:

in a time-ordered data structure comprising a future portion, adding the tag to the future portion of the data structure based on a release time, said data structure having a current-tree near the future portion, said future portion having storage capacity for at least two tags;

removing the tag from an eligible set of tags, including the tag, based on the tag value; and transmitting the packet that is associated with the removed tag on an output link;

where adding includes inserting the tag as a node into a tree that is selected from a plurality of trees.

2. The method of claim 1 wherein removing is preceded by selecting the eligible set of tags.

3. The method of claim 2 wherein selecting further comprises selecting at least one post-current tag, including the tag.

4. The method of claim 2 wherein selecting further comprises selecting a tag having a smallest tag value in a post-current tree.

5. The method of claim 1 wherein removing the tag is preceded by advancing the current-tree, wherein the future portion is based on the current-tree.

6. The method of claim 5 wherein advancing further comprises destroying an old tree at a location T steps from the current-tree and wherein the data structure has at least 2*T trees.

7. The method of claim 6 wherein destroying further comprises reallocating at least one tag of the old tree that has a tag value at least as large as a smallest tag value of the old tree.

8. A method for transmitting a packet, said packet having a release time and a tag having a tag value comprising:
   in a time-ordered data structure comprising a future portion, adding the tag to the future portion of the data structure based on a release time, said data structure having a current-tree near the future portion, said future portion having storage capacity for at least two tags;
   removing the tag from an eligible set of tags, including the tag, based on the tag value; and
   transmitting the packet that is associated with the removed tag on an output link;
   where removing the tag is preceded by advancing the current-tree, where the future portion is based on the current-tree;
   where advancing further comprises destroying an old tree at a location T steps from the current-tree, where the data structure has at least 2*T trees; and
   wherein advancing further comprises adding a tag having a smallest tag value of a tree pointed to by the current-tree to the eligible set of tags.

9. A method for transmitting a packet, said packet having a release time and a tag having a tag value comprising:
   in a time-ordered data structure comprising a future portion, adding the tag to the future portion of the data structure based on a release time, said data structure having a current-tree near the future portion, said future portion having storage capacity for at least two tags;
   removing the tag from an eligible set of tags, including the tag, based on the tag value; and
   transmitting the packet that is associated with the removed tag on an output link;
   wherein adding further comprises adding the tag to a sub-tree portion of a tree; and converting the sub-tree to an optimized sub-tree.

10. The method of claim 1 wherein removing is preceded by advancing a current-tree pointer at least one step through the data structure.

11. A method for transmitting a packet, said packet having a release time and a tag having a tag value comprising:
   in a time-ordered data structure comprising a future portion, adding the tag to the future portion of the data structure based on a release time, said data structure having a current-tree near the future portion, said future portion having storage capacity for at least two tags;
   removing the tag from an eligible set of tags, including the tag, based on the tag value; and
   transmitting the packet that is associated with the removed tag on an output link;
   wherein removing is preceded by determining if the tag is a smallest tag in a post-current tree; and adding the tag to a min-tree provided the tag is the smallest tag.

12. A method in a router for scheduling a packet having a selected tag, said tag having a tag value, said packet having a release time, comprising:
   selecting a selected tree from at least two trees based on the release time, wherein a first tree has a first time period and a second tree has a second time period later than the first time period;
   storing the selected tag in an order in the selected tree by adding a node to the selected tree;
   selecting an eligible set of tags including at least the selected tag; and
   removing the selected tag from the eligible set of tags, wherein the eligible set of tags has no smaller tag value.

13. The method of claim 12 wherein selecting an eligible set of tags further comprises adding the selected tag to a current tree.

14. The method of claim 13 wherein selecting an eligible set of tags further comprises advancing the current tree to a tree having at least one tag.

15. The method of claim 14 wherein advancing further comprises removing at least one tag from an old tree.

16. The method of claim 12 wherein removing a tag further comprises transmitting a packet associated with the selected tag.

17. The method of claim 12 wherein selecting a tree is preceded by determining that the release time is smaller than a discard time.

18. A method in a router for scheduling a packet having a selected tag, said tag having a tag value, said packet having a release time, comprising:
   selecting a selected tree from at least two trees based on the release time, wherein a first tree has a first time period and a second tree has a second time period later than the first time period;
   storing the selected tag in an order in the selected tree;
   selecting an eligible set of tags including at least the selected tag; and
   removing the selected tag from the eligible set of tags, wherein the eligible set of tags has no smaller tag value;
   wherein storing further comprises determining if the selected tag is larger than a node in the tree; placing the selected tag in a left sub-tree provided it is determined that the selected tag is not larger than the node; and
   placing the selected tag in a right sub-tree provided it is determined that the selected tag is larger than the node.

19. An apparatus for transmitting a packet, said packet having a release time and a tag having a tag value comprising:
   means for adding the tag to a future portion of a time-ordered data structure based on a release time, said data structure having a current-tree near the future portion, said future portion having storage capacity for at least two tags;
   means for removing the tag from an eligible set of tags, including the tag, based on the tag; and
   means for transmitting the packet associated with the removed tag on an output link;
   where said means for adding inserts the tag as a node into a tree that is selected from a plurality of trees.

20. The apparatus of claim 19 wherein the apparatus further comprises a means for selecting the eligible set of tags.

21. The apparatus of claim 20 wherein the means for selecting further comprises a means for selecting at least one post-current tag, including the tag.

22. The apparatus of claim 20 wherein the means of selecting further comprises means for selecting a tag having a smallest tag value in a post-current tree.

23. The apparatus of claim 19 wherein the apparatus further comprises means for advancing the current tree, wherein the future portion is based on the current tree.

24. The apparatus of claim 23 wherein the means for advancing further comprises a means for destroying an old tree at a location T steps from the current-tree, and wherein the data structure has at least 2*T trees.

25. The apparatus of claim 24 wherein the means for destroying comprises means for reallocating at least one tag of the old tree that has a tag value at least as large as a smallest-tag value of the old tree.

26. An apparatus for transmitting a packet, said packet having a release time and a tag having a tag value, comprising:

means for adding the tag to a future portion of a time-ordered data structure based on a release time, said data structure having a current-tree near the future portion, said future portion having storage capacity for at least two tags;

means for removing the tag from an eligible set of tags, including the tag, based on the tag; and means for transmitting the packet associated with the removed tag on an output link;

where the apparatus further comprises means for advancing the current tree, where the future portion is based on the current tree;

where the means for advancing further comprises means for destroying an old tree at a location T steps from the current-tree, where the data structure has at least 2*T trees; and wherein the means for advancing further comprises means for adding a tag having a smallest tag value of a tree pointed to by the current-tree to the eligible set of tags.

27. An apparatus for transmitting a packet, said packet having a release time and a tag having a tag value, comprising:

means for adding the tag to a future portion of a time-ordered data structure based on a release time, said data structure having a current-tree near the future portion, said future portion having storage capacity for at least two tags;

means for removing the tag from an eligible set of tags, including the tag, based on the tag; and means for transmitting the packet associated with the removed tag on an output link;

wherein the means for adding further comprises:

means for adding the tag to a sub-tree portion of a tree; and means for convening the sub-tree to an optimized sub-tree.

28. The apparatus of claim 19 wherein the apparatus further comprises means for advancing a current-tree pointer at least one step through the data structure.

29. An apparatus for transmitting a packet, said packet having a release time and a tag having a tag value, comprising:

means for adding the tag to a future portion of a time-ordered data structure based on a release time, said data structure having a current-tree near the future portion, said future portion having storage capacity for at least two tags;

means for removing the tag from an eligible set of tags, including the tag, based on the tag; and means for transmitting the packet associated with the removed tag on an output link;

wherein the apparatus further comprises:

means for determining if the tag is a smallest tag in a post-current tree; and means for adding the tag to a mm-tree provided the tag is the smallest tag.

* * * * *

UNITED STATES PATENT AND TRADEMARK OFFICE
CERTIFICATE OF CORRECTION

PATENT NO. : 6,836,475 B2
DATED : December 28, 2004
INVENTOR(S) : Chaskar et al.

It is certified that error appears in the above-identified patent and that said Letters Patent is hereby corrected as shown below:

Column 10,
Lines 63 and 66, delete "a".

Column 11,
Line 8, delete "a".

Column 12,
Line 15, delete "convening" and replace with -- converting --.
Line 37, delete "mm-tree" and replace with -- min-tree --.

Signed and Sealed this

Fifth Day of April, 2005

JON W. DUDAS
*Director of the United States Patent and Trademark Office*